(No Model.)

H. BARRETT.
MANUFACTURE OF STOPPERS FOR BOTTLES, JARS, AND LIKE VESSELS.

No. 281,333. Patented July 17, 1883.

Witnesses.
Chas. R. Abell.

Inventor.
Henry Barrett,
by John J. Halsted & Son
his atty's

UNITED STATES PATENT OFFICE.

HENRY BARRETT, OF LONDON, ENGLAND.

MANUFACTURE OF STOPPERS FOR BOTTLES, JARS, AND LIKE VESSELS.

SPECIFICATION forming part of Letters Patent No. 281,333, dated July 17, 1883.

Application filed April 24, 1882. (No model.) Patented in England November 25, 1881, No. 5,154; in Germany January 19, 1883, No. 22,835; in France February 23, 1882, No. 147,499, and in Italy March 31, 1883, XVI, 15,031, XXX, 39.

*To all whom it may concern:*

Be it known that I, HENRY BARRETT, a subject of the Queen of Great Britain, residing at London, England, have invented new and useful Improvements in the Manufacture of Stoppers for Bottles, Jars, and like Vessels, of which the following is a specification.

This invention relates to an improved manufacture of stoppers for bottles, jars, and like vessels, and has special reference to the manufacture of what are known as "screw-stoppers," when such stoppers are made from a plastic material—such as lionite—which is liable to be acted on by heat or by the liquid to be bottled. In manufacturing such stoppers according to the present invention, I take a tube of vulcanite, xylonite, celluloid, or like material, such tube being of suitable length and shape to cover the whole or part of the stopper, as may be required. The said tube is placed in the mold of the required shape, and, the mold being heated, plastic material—such as lionite—is then pressed or forced into the tube, so as to cause the tube to take the shape of the mold, and the goods are then finished in any suitable manner. A wire is sometimes inserted in the stopper to strengthen it. By this mode of manufacture I obtain a stopper having the external part wholly or partly coated with vulcanite, and possessing all the advantages of stoppers made wholly from vulcanite or like material, but at a much less cost.

In order to enable my invention to be readily understood, I will proceed to describe the same by reference to the several figures of the accompanying drawings, which show various stoppers manufactured according to my invention.

Figure 1 is a section, and Fig. 2 an elevation, of a screw-stopper made of lionite partly covered with vulcanite, xylonite, celluloid, or like material; and Figs. 3 and 4, sections of similar stoppers having slight variations in their construction.

In manufacturing such stoppers, I take a piece of tubing of vulcanite, xylonite, celluloid, or like material, of a length sufficient to cover the screw portion of stopper, as shown at $a$, and I place the said piece of tubing (previously heated to render it somewhat plastic) in a heated mold suitably constructed to give the desired form to the stopper. Suitable plastic material—such as lionite, $b$—in a heated state, is then pressed or forced into the mold, and the tubing will thereby be caused to take the shape of the mold. In cooling, the shell $a$ contracts, so as to become securely attached to the body $b$ of the stopper, and on the stopper being withdrawn (by being unscrewed) from the mold it may be finished in any suitable manner.

Figure 2:
Figure 1:
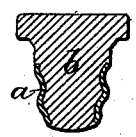
Figure 4:
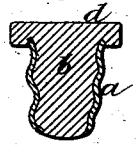
Fig. 4 represents a section of a stopper similar to that shown in Figs. 1 and 2, with the exception that the shell or casing $a$, of vulcanite or like material, covers the whole length of the body of the stopper, the upper edge of the tubing forming the shell $a$ extending into the head $d$ of the stopper, as shown.
Figure 3:
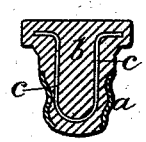
Fig. 3 is a section of a stopper similar to that shown in Figs. 1 and 2, but with the addition of a piece of wire, $c$, which is introduced into the mold before the plastic material is forced therein, such wire $c$ serving to strengthen the stopper.

Having thus described the nature of my said invention and the best means with which I am acquainted for carrying the same into effect, I would have it understood that I do not confine myself to the precise details herein laid down, as it is obvious that the same may be varied without departing from the peculiar character of my invention; but

What I claim is—

The described method of making stoppers for bottles, jars, and like vessels, consisting in pressing or forcing suitable plastic material—such as lionite—in a heated state, into a mold or die, into which a tube of heated vulcanite, xylonite, celluloid, or like material has been previously placed, substantially as shown and set forth.

H. BARRETT.

Witnesses:
 I. I. VARLEY,
 G. F. REDFERN.